UNITED STATES PATENT OFFICE.

ROGER D. BABSON, OF SPRINGFIELD, MASSACHUSETTS, ASSIGNOR TO BAUSH MACHINE TOOL COMPANY, A CORPORATION OF MASSACHUSETTS.

PRODUCTION OF GEARS.

1,371,214.   Specification of Letters Patent.   Patented Mar. 15, 1921.

No Drawing.   Application filed March 3, 1920. Serial No. 363,103.

*To all whom it may concern:*

Be it known that I, ROGER D. BABSON, a citizen of the United States, and resident of Springfield, Massachusetts, have invented certain new and useful Improvements in the Production of Gears, of which the following is a specification.

My invention provides a gear, and particularly a worm gear, of a new material and having a new combination of qualities; and also a composition and method for use in the manufacture of such gears.

For many years aluminum and alloys thereof have been used to a greater or less extent, but no such alloy has been thought to be adapted for use in the making of gears, having the necessary physical qualities to make a gear which should be strong and durable against abrasion, and which could be readily cut or machined to the great accuracy required for good gears and especially for the best worm gears. I have found that there are certain alloys of aluminum which by an appropriate method of manufacture and treatment can be made into gears and especially into worm gears which will have the comparatively frictionless qualities of bronze (of which the best worm gears are now made) with greater durability and strength and much greater lightness, at or about the same cost as bronze. These qualities make such gears greatly desirable for automobiles and other apparatus where lightness is of importance in proportion to strength. A specific example of the composition and method which I prefer is the following.

An alloy is used consisting of aluminum 94%, magnesium 0.5% and the balance of chromium, manganese and copper in varying proportions. The chromium is less important than the other ingredients, but is useful in producing a good polished wearing surface. This alloy is cast into ingots, worked as by rolling or forging into billets and then cut and further forged into blanks in the form of a ring. These rings in fact are preferably drop-forged. Such forging or otherwise working of the metal increases its tensile strength, as, for example from 27,000 pounds per square inch, to from 36,000 to 40,000 pounds.

The forged rings are then heated to a temperature approximating 500 to 525 degrees centigrade and quenched. It is found that this heat treatment improves the physical qualities very substantially. For example, a forging having beforehand an ultimate tensile strength of 36,000 pounds will have its strength increased to from 55,000 to 60,000 pounds per square inch. The elastic limit will be raised from 25,000 to 36,000 pounds per square inch; the elongation from 2 to 20% and the reduction under strain from 6 to 40%. There is thus produced a metal having approximately the strength of steel with the comparatively frictionless quality of the best bronze and of a weight very much less than either of these two metals, about one-third as great, in fact.

The heat treatment is not completely effective at once. It requires an aging of the metal for a period from one to five days in order to bring it to the desired physical characteristics. I prefer after the heat treatment to again forge or press the metal still in the form of a ring or blank, and then to cut or machine it into a worm gear. The aging of the metal after the heat treatment serves also to bring it to a condition in which it machines or cuts better than before. The machining may be done before the aging is complete but it can better be done afterward.

There are considerable variations possible in the composition of the aluminum alloy and in the proportions of the components. The important thing is to use such an alloy as will be capable of transformation by heat treatment into a metal of comparatively high strength and elastic limit, though it consists chiefly of aluminum and weighs little more than aluminum.

The aluminum alloys above referred to and the heat treatment thereof have been known for a number of years, examples of the same being described in Wilm Patents 1,130,785 filed in 1911, and 1,261,987 filed in 1912. They have not been used, however, for gears or the like although throughout this period numerous efforts have been made especially in the automobile industry to find a light and satisfactory substitute for the heavy corrodible steel and the heavy expensive bronzes which have been in use. By an extensive series of experiments on worm gears for automobile trucks made as above described I have discovered that such gears have not only the known qualities of lightness and strength but also a quite unexpected resistance to distortion, abrasion and smoothness or lack of friction which make them sufficiently durable for practical use. It is noticeable also that the friction between a driving worm or gear and a driven gear where both are of this material is not noticeably greater than where they are of different materials, which is not true of most other materials. This property permits the making of both the driving and the driven gear of the aluminum alloy with the same frictionless effect as if one of the gears were of other metal. I have found by experience that these gears run with an extraordinary and unexpected quietness. The forged heat treated alloy was found also to be capable of machining easily and with the extreme accuracy required to make a good gear.

The best results have been obtained with an excessive working of the alloy in making the billet or the blank, and the alloy referred to lends itself excellently to such operations. For example, in the making of the gears referred to I have rolled and forged the metal down to one-third or one-fourth of the original cross-section. This has produced a dense, tough, fibrous, structure excellently adapted for use in a gear and yet capable of being cut readily by ordinary steel cutters.

My invention is particularly advantageous in worm gears for automobile driving mechanisms. Such worm gears are of comparatively large size and when made of steel provide an excessive weight on the rear axle of the car, and an even greater weight when made of bronze. The weight of the rear axle and the parts generally carried thereby is already greater than is desired and my invention permits a very considerable reduction in such weight. This invention is also valuable in connection with other kinds of gears, such as spur or bevel gears.

What I claim is:

A gear composed of an alloy including aluminum magnesium, manganese and copper and comprising about 94% aluminum and about 0.5% magnesium, which alloy has been subjected to excessive working and has been heated to a temperature approximating 500 to 525 degrees centigrade and then quenched and cut into the desired shape.

In witness whereof, I have hereunto signed my name.

ROGER D. BABSON.